United States Patent [19]

Bland

[11] 3,747,574

[45] July 24, 1973

[54] INTERNAL COMBUSTION ENGINE

[75] Inventor: Edward N. Bland, Seattle, Wash.

[73] Assignee: Edward Floyd Bland, Seattle, Wash.

[22] Filed: June 9, 1971

[21] Appl. No.: 151,364

[52] U.S. Cl. ............................... 123/21, 123/43 C
[51] Int. Cl. ..................... F02b 57/00, F02b 69/06
[58] Field of Search ............. 123/43 R, 43 B, 43 C,
123/21; 60/315, 311, 901

[56] References Cited
UNITED STATES PATENTS

| 791,071 | 5/1905 | Bartosik | 123/21 UX |
|---|---|---|---|
| 1,380,404 | 6/1921 | Miller | 123/43 R |
| 1,572,541 | 2/1926 | Lawrence | 123/43 C |
| 1,823,132 | 9/1931 | Cunningham | 123/43 B |
| 1,918,174 | 7/1933 | Berggren | 123/43 C |
| 2,023,403 | 12/1935 | Butler | 60/315 |
| 2,417,894 | 3/1947 | Wayland | 123/43 C |
| 3,100,146 | 8/1963 | Huntington | 60/311 X |
| 2,444,440 | 7/1948 | Grieshaber | 123/21 X |

FOREIGN PATENTS OR APPLICATIONS

| 184,579 | 8/1922 | Great Britain | 123/43 C |
| 46,081 | 2/1929 | Norway | 123/43 R |

Primary Examiner—Carlton R. Croyle
Assistant Examiner—Michael Koczo, Jr.
Attorney—Seed, Berry, Dowrey & Cross

[57] ABSTRACT

A rotary internal combustion engine having a rotary power unit comprising cylinder assemblies rotating an output shaft about a central axis. The engine while running may be converted between four-cycle and two-cycle operation. An exhaust system employs a chemically treated filter for removing pollutants and provides for reburning a portion of the exhaust. The engine may be run by spark initiated combustion or by spontaneous combustion with fuel injection. Multiple cylinder assemblies may be placed in orbits about the central power shaft for increasing the power of the engine.

12 Claims, 23 Drawing Figures

Patented July 24, 1973

INVENTOR.
EDWARD N. BLAND

BY Seed, Berry Dowrey & Ross

ATTORNEYS

Patented July 24, 1973

INVENTOR.
EDWARD N. BLAND

BY

ATTORNEYS

Patented July 24, 1973 3,747,574

7 Sheets-Sheet

INVENTOR.
EDWARD N. BLAND

BY Seed, Berry, Dowrey & Cross

ATTORNEYS

Patented July 24, 1973

INVENTOR.
EDWARD N. BLAND

BY

ATTORNEYS

Patented July 24, 1973 3,747,574

INVENTOR.
EDWARD N. BLAND
BY
ATTORNEYS

Patented July 24, 1973 3,747,574

INVENTOR.
EDWARD N. BLAND

BY
*Seed, Berry, Dowrey & Cross*

ATTORNEYS

INTERNAL COMBUSTION ENGINE

BACKGROUND OF THE INVENTION

1. Field of the Invention

This invention pertains to rotary internal combustion engines and, more particularly, to such engines wherein both the cylinder and reciprocating-piston move in a circular path about a central axis of the engine.

2. Description of the Prior Art

The conventional reciprocating internal combustion engine is rigid between the center of the crank shaft and the cylinder head with the pistons driving connecting rods secured to cranks of the crankshaft. This type of conventional engine presents several problems, for example, the amount of torque is small due to the limited distance between the connecting rods and the center of the crank shaft, compression values are limited, and carbon build-up frequently causes the engine to run backwards when the ignition is turned off.

Another reciprocating internal combustion engine design is illustrated in U.S. Pat. No. 1,380,404. This type of engine employs a cylinder and piston, similar to a conventional reciprocating piston engine, that rotates about a central axis of the engine. Engines of this type, however, heretofore have been generally unsatisfactory due to the amount of drag caused by the cam shafts, cam followers and other control elements necessary for driving the engine and actuating the intake and exhaust valves. Furthermore such engines have in general been limited to a small number of cylinders and pistons and thus were limited in power output. This shortcoming in power output resulted in various attempts to provide both four-cycle and two-cycle operation, however, in prior art engines this necessitated stopping the engine and/or substituting various engine parts.

SUMMARY OF THE INVENTION

It is an object of this invention to provide a rotary reciprocating-piston, internal combustion engine which is low in drag and produces a high torque.

It is another object of this invention to provide an engine that may be switched between two-cycle and four-cycle operation or vice versa while the engine is running.

It is another object of this invention to provide a rotary reciprocating-piston, internal combustion engine that can be easily modified to obtain combustion spontaneously.

It is another object of this invention to provide a rotary reciprocating-piston, internal combustion engine the power output of which may be varied by adding additional cylinder assemblies in any particular orbit or adding additional orbits of cylinder assemblies.

It is another object of this invention to provide a rotary reciprocating-piston, internal combustion engine which utilizes centrifugal force to supercharge the fuel-air mixture delivered into the cylinder and to assist in positioning control elements when shifting between four-cycle and two-cycle operation.

Basically the preferred form of the invention includes a stationary, generally cylindrical housing including first and second opposed side walls joining a circumferential end wall. An output shaft is rotably mounted in the housing and is fixed to a rotary power unit having at least two cylinder assemblies, an intake manifold, and an exhaust manifold. Each of the cylinder assemblies includes intake means coupled to said intake manifold, exhaust means coupled to said exhaust manifold, a cylinder, a piston, a connecting rod having a free end intermittently engagable with circumferentially spaced stop means formed in said housing end wall, and ignition means for producing combustion in the cylinders to push the free end of the connecting rod against the stop means. Thus the rotary power unit is propelled around said housing to rotate said output shaft. The ignition means can be an electrical spark or spontaneous combustion. The cylinder assemblies can be arranged in a single orbit or multiple parallel or concentric orbits. Valving and ignition means are provided for operating the engine either in four-cycle or two-cycle operation and for converting between the two while the engine is running.

The valves in the four-cycle operation are operated by cams only intermittently at spaced locations around the cylindrical housing thus there is only limited drag on the engine caused by valve operation. With the ability to shift between four-cycle and two-cycle while the engine is running maximum power can be obtained when the power demands are greatest and maximum efficiency can be obtained with the four-cycle operation under lower power requirements. The piston and cylinder rotate in an orbit spaced substantially from the central axis of the engine to provide a large amount of torque even while operating at a slow speed. The exhaust valve timing controls the amount of exhaust gases expelled thus allowing limited reburning of spent gases. Since the cylinders as well as the pistons are rotating they are self-cooled by the surrounding air.

DESCRIPTION OF THE PREFERRED EMBODIMENTS

Figure 5:
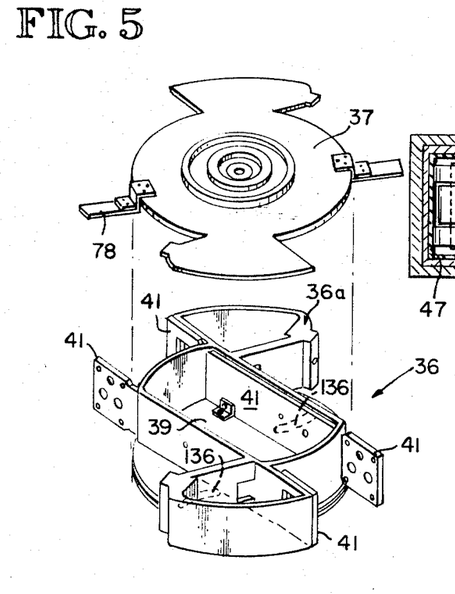
FIG. 5 is an exploded isometric of a portion of a rotary power unit utilized in the engine of FIG. 1.

In general, the rotary reciprocating-piston internal combustion engine of this invention comprises a stationary generally cylindrical housing 30 having a top or first sidewall 31 (FIG. 2) a substantial portion of which is openmesh to assist in air cooling, a lower or second sidewall 32, and a circumferential end wall 33. Mounted for rotation in the housing by suitable bearings is an output shaft 34 coupled to a transmission or other output device by suitable gears 35. Coupled to the output shaft 34 is a rotary power unit 36. The rotary power unit includes two cylinder assemblies 38, to be later described in more detail, which are revolved in the housing past an annular exhaust manifold 40. The rotary power unit 36 includes a body 36a (FIG. 5) provided with removable top and bottom walls 37 and 39. Extending outwardly from the body are torsion plates 41 which assist in absorbing the shock created by combustion in the cylinders. For spark ignition the electrical timing is controlled by a distributor 84 and the air-gas mixture is supplied through a conventional carburetor 43. The housing 30 is mounted on the vehicle chassis by brackets 44 secured to each side wall 31 and 32 and to the end wall 33.

Figure 6:
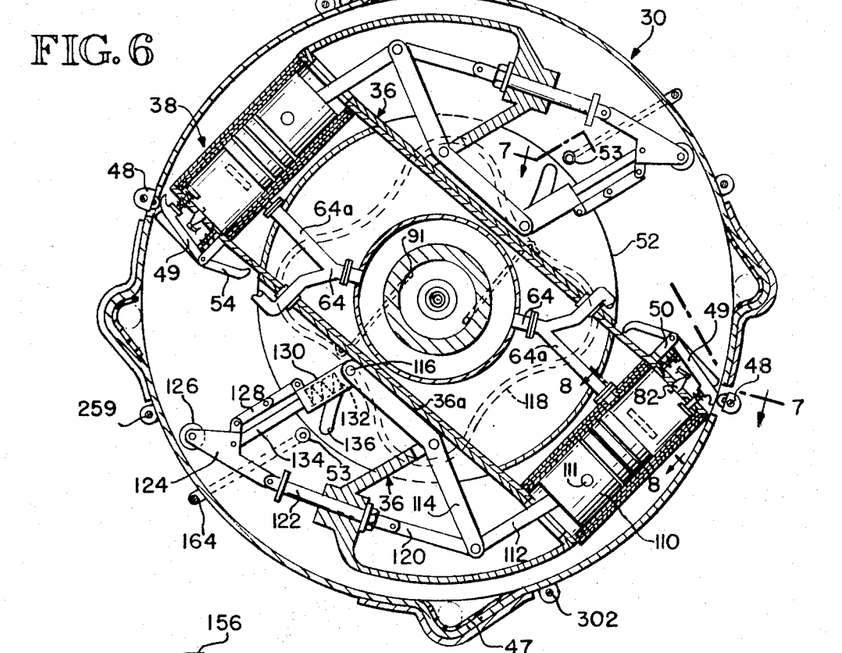
FIG. 6 is a fragmentary horizontal section of the engine illustrating the power unit during the exhaust stroke of a four-cycle operation.

The cylindrical housing 30 is provided with four circumferentially spaced stop means or recesses 47 (FIG. 3) lined with a sound absorbing resilient, highly durable, rubber or neoprene-impregnated woven webbing material. Two diametrically opposed exhaust cams 48 protrude through the end wall 33. The exhaust cams move in slots in the end wall to actuate the exhaust valves of the two cylinder assemblies shown. As best shown in FIG. 6 the exhaust cams 48 are engaged by an exhaust rocker arm 49 pivotally mounted to a post 50 which is secured to a rotating cylinder assembly. Movement of the exhaust rocker arm opens the exhaust valve in the cylinder assembly against the bias of a valve spring in a conventional manner.

Figure 3:
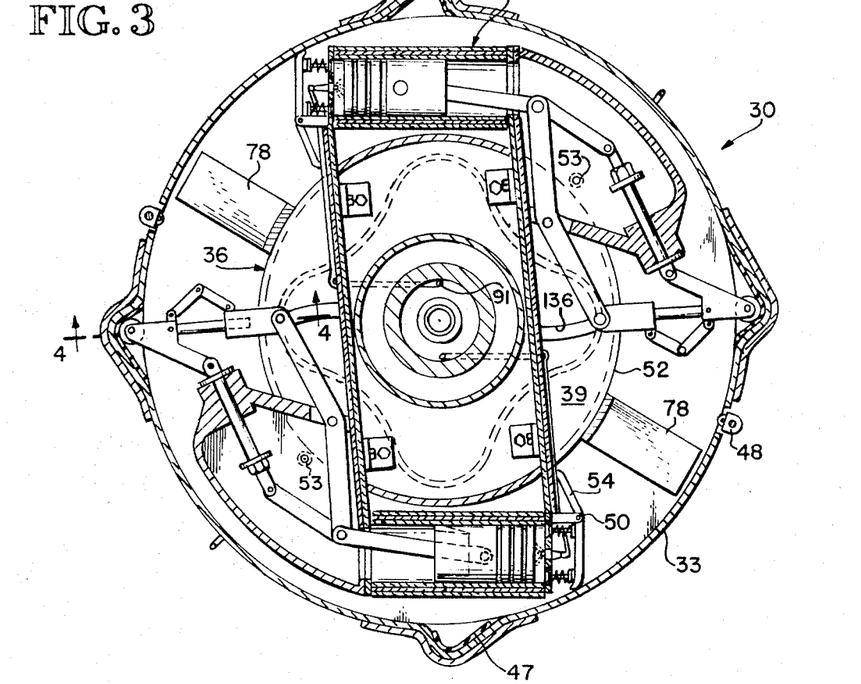
FIG. 3 is a section taken along the line 3—3 of FIG. 2.

Positioned adjacent a stationary, circumferential interior wall 52 (FIG. 3) of the housing 30 are two diametrically opposed intake cams 53. The intake cams 53 are engaged by an intake rocker arm 54 pivotally mounted to a post 56 also secured to the cylinder assembly. As is best shown in FIGS. 3 and 7 engagement of the rocker arm 54 against the cam 53 will open the intake valve against the bias of a valve spring in a conventional manner.

Figure 2:
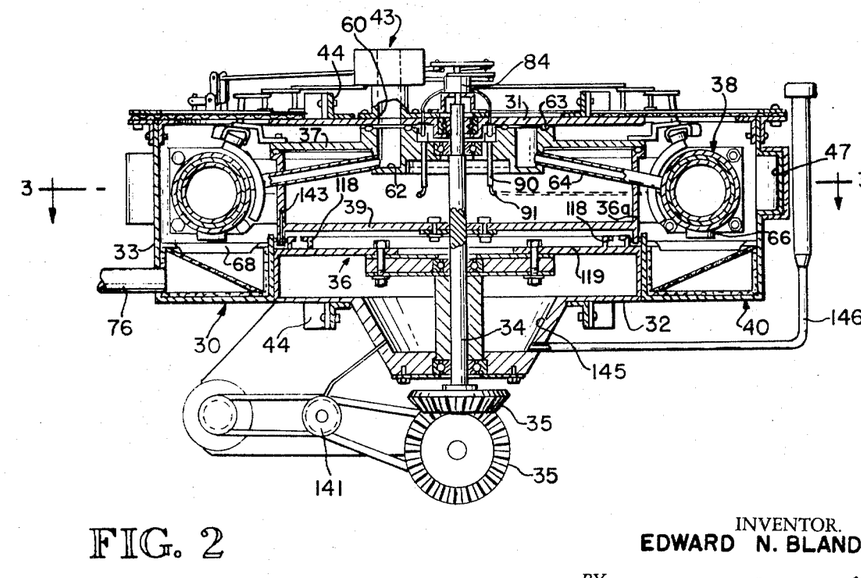
FIG. 2 is a transverse section taken along the line 2—2 of FIG. 1.
Figures 9, 10:
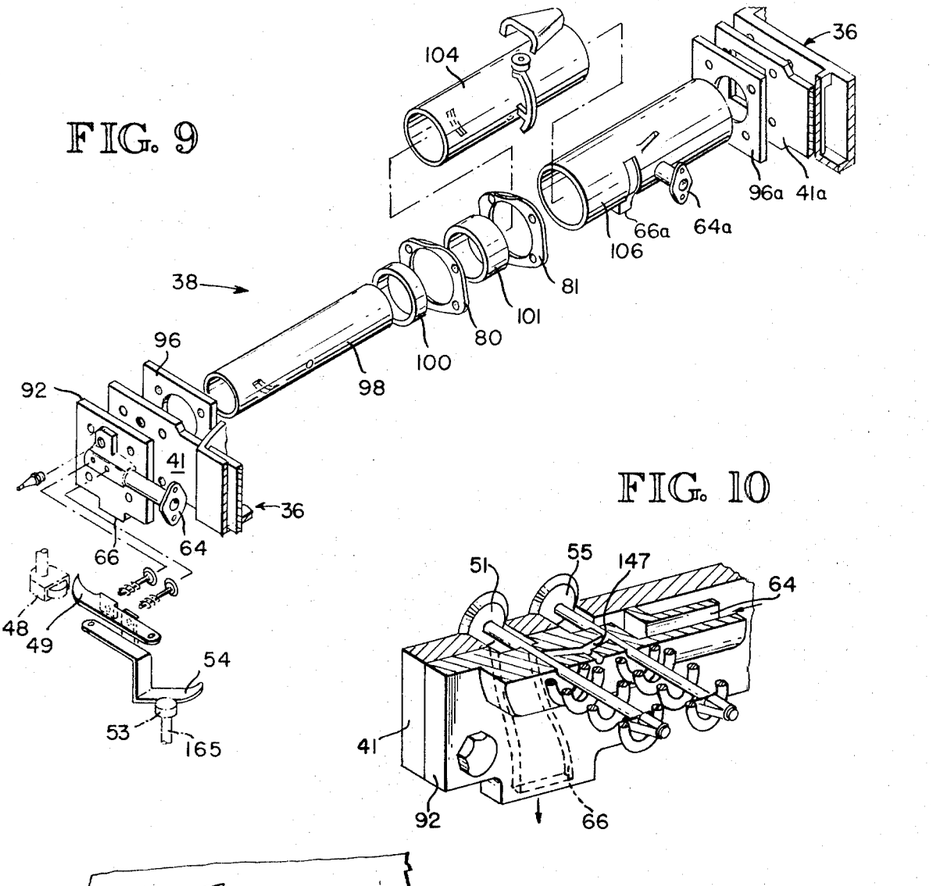
FIG. 9 is an exploded view of a typical cylinder assembly employed in the engine and illustrating the cams for actuating the intake and exhaust valves.
FIG. 10 is a fragmentary isometric of the cylinder assembly with parts broken away for clarity and illustrating the intake and exhaust passages for four-cylinder operation.

As thus far described it can be seen that as the cylinder assemblies 38 rotate about the housing 30 the intake and exhaust valves are intermittently opened as in any four-cycle reciprocating-piston, internal combustion engine. The means for introducing the gas and air mixture into the cylinders is best shown in FIGS. 2, 9 and 10. A conventional carburetor 43 is coupled through a port 60 in the sidewall 31 to an intake chamber 62 which rotates and forms part of the rotary power unit 36. Suitable seals 63 prevent leakage of the air-fuel mixture. The air-fuel mixture in the chamber 62 is distributed through intake manifolds 64 to intake valves 55. Since the manifolds 64 are rotating, the air-gas mixture is forced outwardly by centrifugal force thus supercharging the engine.

Figure 7:
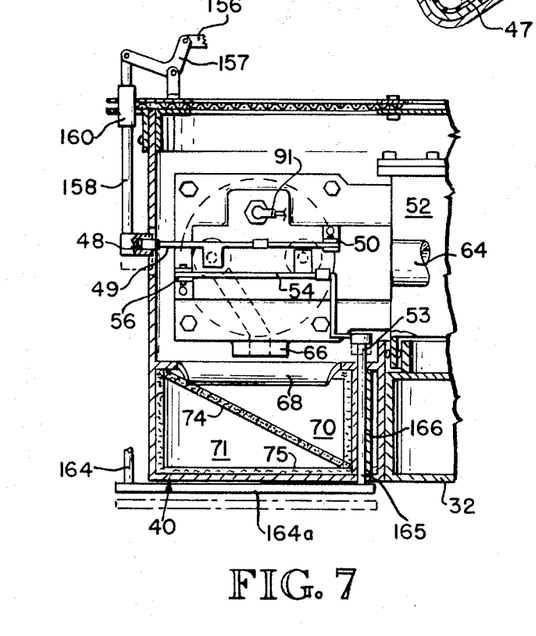
FIG. 7 is a vertical fragmentary section taken along the line 7—7 of FIG. 6.

The exhaust gases within the cylinders are exhausted through the exhaust collector 40 via an exhaust valve 51 by means best shown in FIGS. 2, 7 and 10. An exhaust manifold 66 is coupled to the exhaust valve 51 and directs the exhaust products outwardly through louvers 68 into the collector 40. The collector is divided into first and second chambers 70 and 71, respectively, separated by a filter 74. The filter will remove solid constituents and may be treated by suitable chemicals to react with the exhaust gases and thus remove a portion of the pollutants. Preferably the chambers 70 and 71 are made of stainless steel and the interior thereof lined with a heat resistant insulation 75. The filtered exhaust gases are removed through an exhaust pipe 76. Fan blades 78 (FIG. 3) are secured to the power unit top wall 37 to increase circulation of the exhaust products through the filter 74. In addition to the fan blades as will be later described, each cylinder assembly 38 is also provided with fins to assist in forcing the air through the filter.

Figure 15:
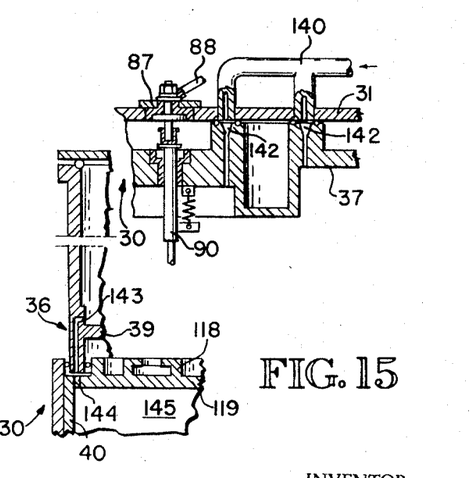
FIG. 15 illustrates a portion of the ignition and oil distribution systems employed in the engine.
Figure 16:
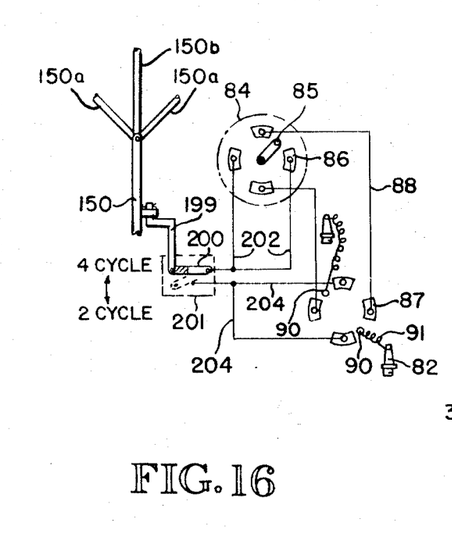
FIG. 16 is a schematic illustrating the ignition system of the engine shown in FIG. 1 and the means by which the ignition is switched from four-cycle to two-cycle operation.

Ignition is provided by sparkplugs 82 (FIG. 6) which receive an electrical pulse in the same manner as a conventional reciprocating internal combustion engine. As best shown in FIGS. 2, 15 and 16, a conventional distributor 84 intermittently delivers timed electrical pulses in a conventional manner, that is, a rotor 85 is connected to a coil, not shown, and energizes circumferentially spaced contacts 86. Two of the contacts 86 are coupled to two contacts 87 by wires 88. Contacts 87 are spaced around the sidewall 31 of the housing 30. Two roller contacts 90 in the power unit 36 deliver the spark via wires 91 to each of the spark plugs 82 in the cylinder assemblies. Each contact 87 is of sufficient length to accomodate spark retardation or advancement by the distributor. As the electrically energized rotor 85 passes over each contact 86 in the distributor 84 it energizes the particular contact 86. Two of the contacts are coupled to contacts 87 by wires 88, therefore, contacts 87 are also intermittently energized. The rotation of the rotor 85 is synchronized with rotation of the power unit 36 therefore roller contact 90 will pass over an energized contact 87 at the precise time a spark is desired in one of the cylinders.

The means for driving the rotary power unit 36 will now be described. As best shown in FIG. 9 each cylinder assembly 38 includes a cylinder head 92 fastened to a torsion plate 41 which abuts a sleeve block 96. Suitable gaskets, not shown, are provided between the cylinder head, torsion plate and sleeve block in a conventional manner. A cylinder barrel 98 fits through central openings in the torsion plate and sleeve block. A similar torsion plate 41a and sleeve block 96a are provided at the opposite end of the cylinder. The head end of the cylinder assembly is provided with a spacer 100 which rests against the sleeve block 96. A pair of air circulating fins 80 and 81 separated by a second spacer 101 are mounted adjacent the first spacer 100. The fins provide additional air flow to force exhaust gases through the exhaust filter 74. Mounted over the remaining portion of the cylinder barrel 98 is a sleeve tube 104 which in turn is circumscribed by a casing 106.

Figure 4:
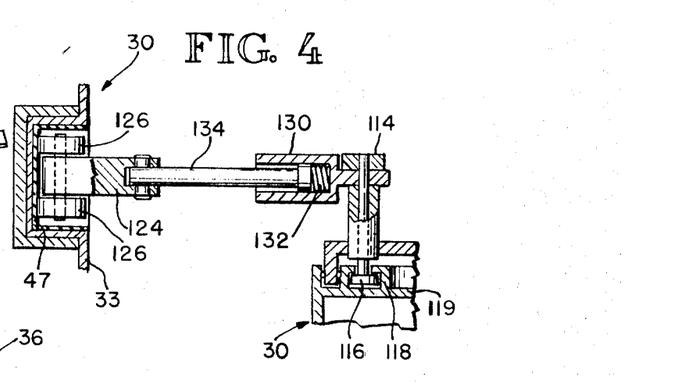
FIG. 4 is a fragmentary section taken along the line 4—4 of FIG. 3.

Slidably mounted within the cylinder barrel 98 is a conventional piston 110 (FIG. 6). The piston is connected by a pin 111 to a connecting rod 112 which is coupled to a bellcrank 114 and rod link 120. The bellcrank is pivotally secured at its midpoint to the body 36a of the rotary power unit 36 and is provided at its free end with a depending cam follower 116. The cam follower rides in a track or cam slot 118 (FIGS. 2 and 4) fixed on a stationary plate 119 near the second sidewall 32 of the housing 30. The link 120 is coupled to a compression-tension rod 122 which is reciprocably mounted in the body of the rotary power unit. A foot rod 124 is pivotally coupled to the rod 122 and is provided at its free end with a pair of foot rod rollers 126. Scissors links 128 are coupled between the foot rod 124 and a guide tube 130. The guide tube houses a compression spring 132 which is engaged by a compression shaft 134 that slides in the guide tube 130. The compression shaft is pivoted at its free end to the foot rod 124. Slots 136 are provided in the lower wall 39 of the body 36a of the power unit assist in guiding each cam follower 116 as it travels in the track 118.

In operation, as the rotary power unit 36 rotates about the housing 30, combustion in each cylinder 98 will drive the respective piston 110 rearwardly with respect to the cylinder. The cam follower 116 at the moment of combustion is in the radially outermost lobe of the track 118 and thus the foot rod rollers 126 will be preseed outwardly into a recess 47 via the guide tube 130, spring 132, and compressing shaft 134. Since the cylinder assembly is also revolving, centrifugal force will aid in pressing the foot rod rollers outwardly. With the foot rod rollers placed against the web material in the recess 47 power from the piston stroke will be passed from the instantaneously halted foot rod rollers to the cylinder to thus drive the rotary power unit forward in the the counterclockwise direction.

Lubrication is provided through various ports and oil lines provided throughout the engine the details of which will be apparent to one skilled in the art. The lubricant is delivered to the engine from an oil pump 141 by a distribution system best shown in FIG. 15. The distribution system includes stationary lines 140 connected to the rotary power unit 36 through suitably sealed ports 142. Oil passing through the engine is collected via ports 143 and 144 into an oil sump 145 and is then directed back to the pump. A filling line 146 is provided for maintaining a proper level in the sump. Oil is distributed throughout the rotary power unit 36 by splashing. Lubrication for external elements is accomplished by sealed lubricating bearings. Oil to the valve stems is provided by a line, not shown, from the rotary power unit to bores 147 in each cylinder head 92.

As thus far described the rotary engine can be operated on four-cycles. A unique feature of this invention is that the engine may be converted to two-cycle operation while still running. For this purpose the engine is provided with a cycle control handle 150 (FIG. 20) which is slidably mounted on the side wall 31. The control handle is pivotally coupled to two links 150a and a link 150b. Link 150b is pivotally secured to a bellcrank 152 which rotates on a post 153 mounted on the wall 31. Bellcrank 152 is rigidly secured to a bellcrank 154. Bellcrank 154 is provided with two exhaust links 156 each of which is pivotally coupled to an exhaust bellcrank 157. The exhaust bellcranks 157 are coupled to shafts 158 which slide in bearings 160 mounted on the end wall 33. The shafts 158 are secured to the exhaust cams 48. As can be readily seen, pushing on the control handle 150 will pivot bellcranks 152 and 154 clockwise to raise each exhaust cam 48 into the position shown in FIG. 7 and will be in the path of the exhaust rocker arms 49 for four-cycle operation. Opposite movement of control handle 150 will lower the exhaust rollers out of the path of the rocker arms 49 for two-cycle operation. Bellcrank 154 also is provided with intake links 162 each of which is pivotally coupled to an intake bellcrank 163. The bellcranks 163 are coupled to shafts 164 that ride in bearings 165 secured to the end wall 33. The shafts 164 are coupled by brackets 164a to shafts 165 that ride in bearings 166, in the bottom of housing 30. The shafts 165 are coupled at the upper ends to the intake cams 53. Again, pushing on the control handle 150 will rotate the bellcranks to raise the intake cams 53 into the path of the intake rocker arms 54 as shown in FIG. 7.

Figure 8:
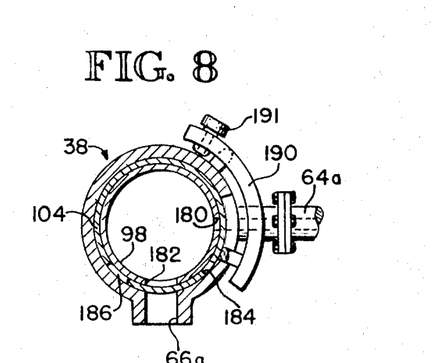
FIG. 8 is an enlarged section taken along the line 8—8 of FIG. 6.
Figure 11:
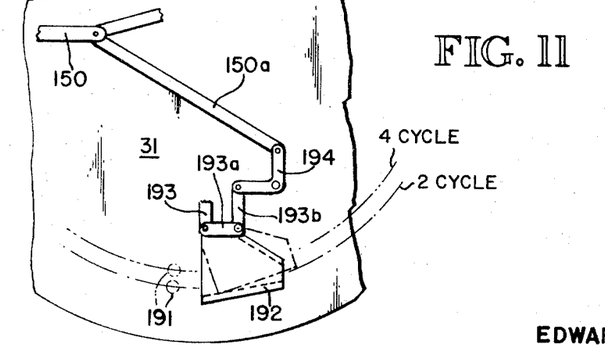
FIG. 11 is a fragmentary schematic illustrating the principle of shifting between four-cycle and two-cycle operation.
Figure 12:
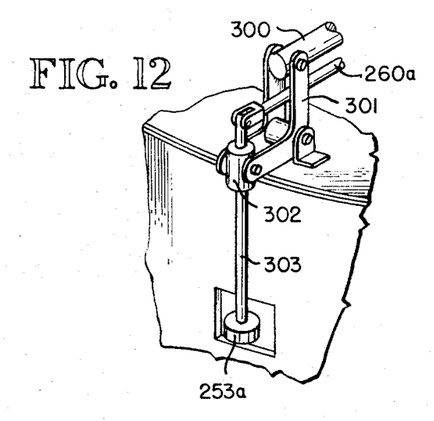
FIG. 12 illustrates the fuel injection cam for use with the spontaneous combustion application of the engine and with the control apparatus for deactivating the cam for four-cycle operation.
Figure 13:
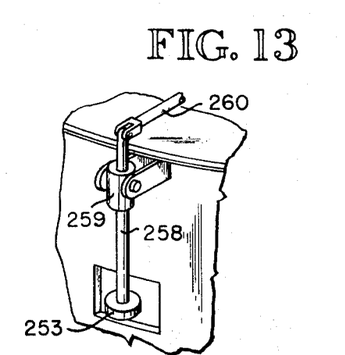
FIG. 13 illustrates a fuel injection cam for use with the spontaneous combustion application of the engine and with the engine in four-cycle operation.
Figure 14:
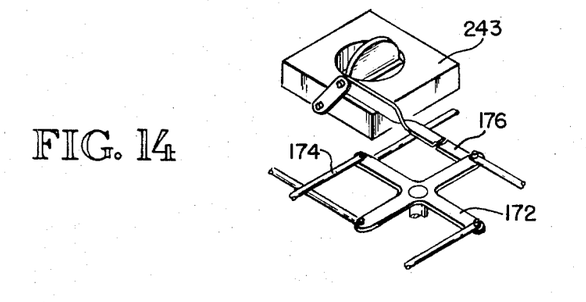
FIG. 14 is a fragmentary schematic of a portion of the throttle used in spontaneous combustion operation.

For two-cycle operation the cylinder is provided with an intake port 180 (FIG. 8) and an exhaust port 182. Sleeve tube 104 is provided with an intake valve port 184 and an exhaust valve port 186. As shown in FIG. 8 the engine is set for four-cycle operation with the respective ports 180, 184 and 182,186 misaligned. To place the cylinder assembly into two-cycle operation the sleeve 104 is rotated counter-clockwise as shown in FIG. 8 so that the respective ports 180, 184 and 182,186 are aligned. If the four-cycle intake and exhaust cams 53 and 48 are lowered, intake and exhaust is exclusively through the two-cycle ports. The exhaust manifold 66 serves the four-cycle and an exhaust manifold 66a serves the two-cycle operation and an arm 64a of the intake manifold 64 directs the fuel-gas mixture from carburetor 43 to the intake ports 180. Each sleeve 104 is rotated between its operative two-cycle position and its inactive four-cycle position and its inactive four-cycle position by a lever 190 having a roller 191. As best shown in FIGS. 2 & 11 each roller 191 is engaged by downwardly extending surfaces of shift guides or gates 192 as it is carried about the housing 30. Each shift guide 192 is pivotally supported on the wall 31 by a pivot bracket 193. Links 193a and 193b couple the pivot bracket to a bellcrank 194 which in turn is coupled to a link 150a of the control handle 150. Thus shifting the handle 150 also rotates the sleeve 104 between its four-cycle and two-cycle positions with centrifugal force assisting in keeping the shift gate positioned in either the two-cycle or four-cycle positions.

Spark frequency is increased for two-cycle operation to produce two additional electrical sparks per revolution of the engine. As best shown in FIG. 16 this is accomplished by a link 199 coupled to the handle 150 and to a movable contact 200 provided in a switch box 201. The movable contact 200 in FIG. 16 is shown positioned for four-cycle operation. When moved into the phantom line position by pushing handle 150 conductors 202 become coupled to wires 204 thus intermittently energizing the two additional contacts 87. In this manner each roller contact 90 receives a pulse four times during each revolution of the engine.

Figure 1:
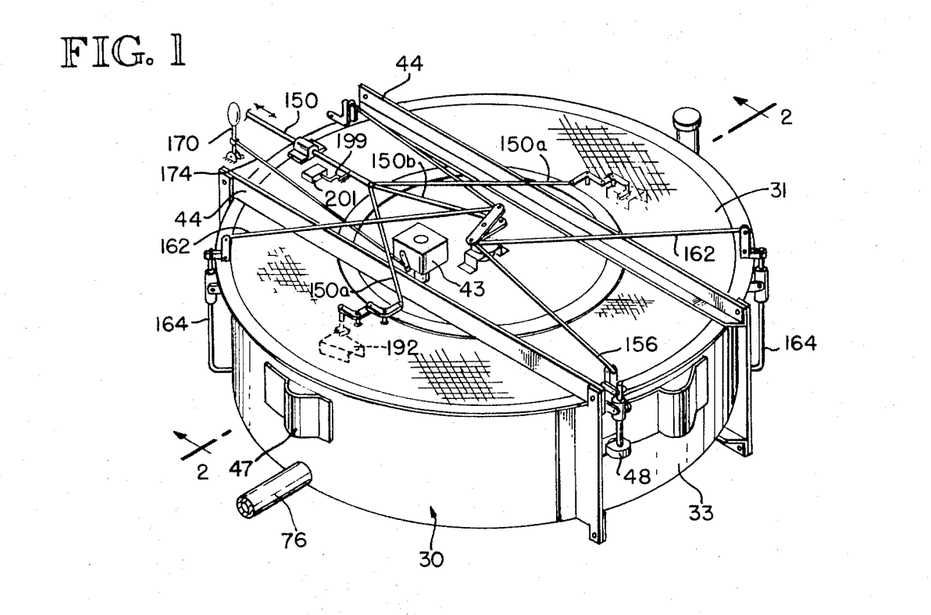
FIG. 1 is an isometric of a rotary internal combustion engine embodying the principles of the invention.

Speed control is effected in both two-cycle and four-cycle operation by a speed control handle 170 (FIG. 1) coupled to a link 174 that moves the throttle of the carburetor 43 and thus controls engine speed as in a conventional engine.

Ignition can also be obtained by spontaneous combustion, i.e., without an electrical spark, by the injection of an air-gas mixture into the cylinders. As best shown in FIGS. 12, 13, 14, 17 and 20 this is accomplished by substituting fuel injection means for the spark plugs 82 and electrical wires 91 of the preferred embodiment and the removal of the carburetor 43. In place of the carburetor an air intake 243 is provided controlled by a butterfly valve in a conventional manner. A mixture of fuel and air is introduced into the cylinder by a fuel injection nozzle 282 that is placed in the spark plug hole. The mixture for four-cycle operation is controlled by a spring biased valve 283 operated by two cams 253 spaced around the housing 30. Air is brought to the nozzle from the air intake 243 by a tube 260 and mixes with fuel in a line 262. The fuel is delivered from a pump 263 through a bore 235 in a modified rotary output shaft 234 rotatably mounted between the stationary walls 232 and 239 of the engine housing. The pump is connected to the bore 235 via a bore 236 in the lower sidewall 232 of the engine housing with suitable seals being provided to prevent leakage. The position of the fuel injection cams 253 relative to the valve 283 determines the extent of fuel injected into the cylinder. The fuel injection cams 253 are mounted on shafts 258 that are pivotally mounted on brackets 259 to swing the cams 253 radially inward and outward of the engine housing. Links 260 join the shafts 258 to a four arm bellcrank 172 which is rotated by the speed control handle 170 via link 174.

Additional fuel injection cams 253a are circumferentially spaced from the cams 253 and are positionable to engage the fuel injection valves 283 during the additional two strokes of the engine for two-cycle operation as well as being positionable for control of the amount of air-fuel mixture. The quantity of air-fuel injected is determined by links 260a which are also coupled to the bellcrank 172. Positioning the fuel injection cams 253a to provide fuel injection for two-cycle operation is accomplished by links 300 that are coupled to the bellcrank 152 and to bellcranks 301. The bellcranks 301 pivotally support sleeves 302 which slidably receive shafts 303, that in turn mount the fuel injection cam 253a. Thus the cams 253a may be moved under the influence of either links 300 or links 260a, the former for switching between two-cycle and four-cycle operation and the latter for adjusting the amount of air-fuel mixture injected into the cylinders. The air control for the air-fuel mixture is obtained by a link 176 also coupled to bellcrank 172 and to the butterfly valve of the air intake 243.

Figures 17, 18, 19, 20:
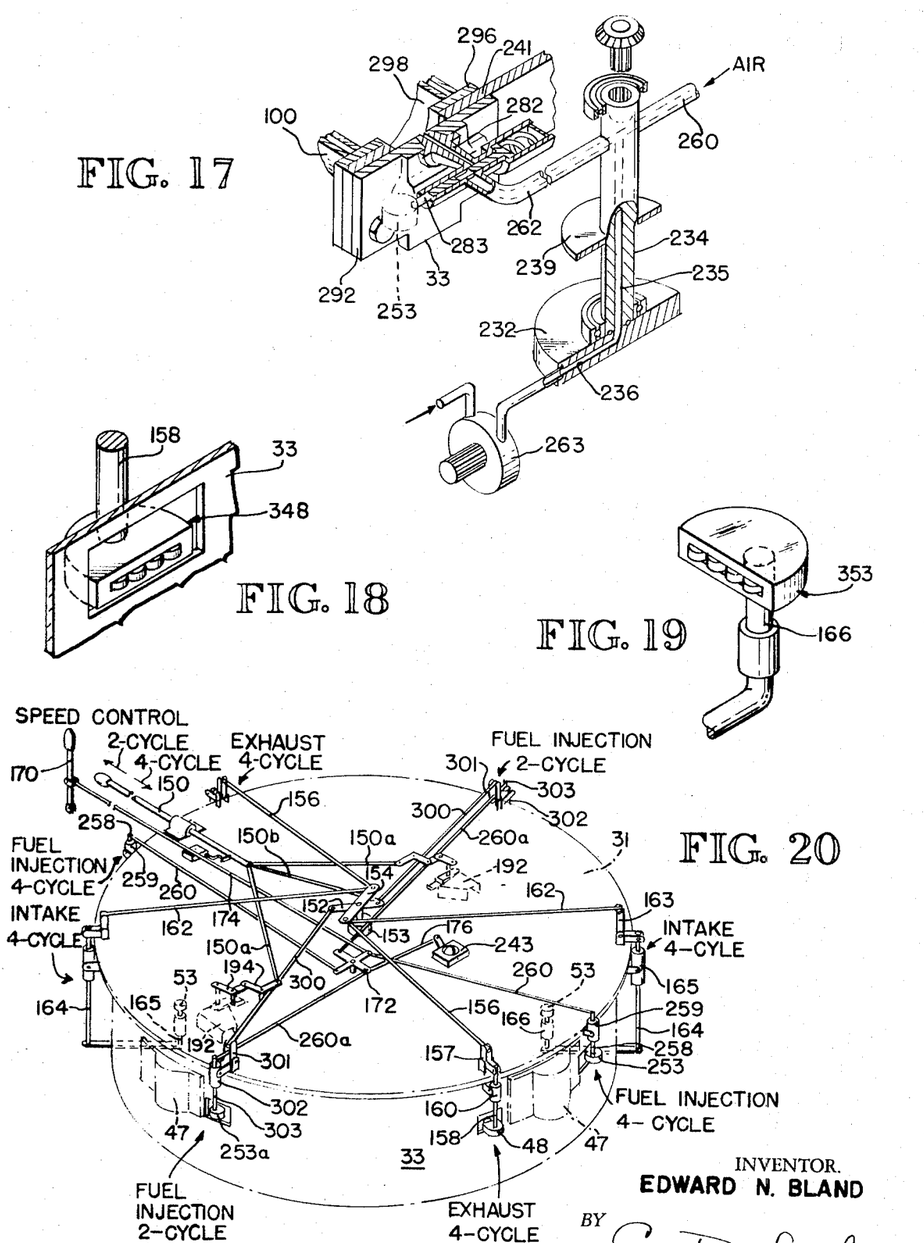
FIG. 17 is a fragmentary isometric of the fuel in injection system employed with the spontaneous combustion application of the engine.
FIG. 18 is a fragmentary isometric illustrating a modified form of the cam for actuating the exhaust valve.
FIG. 19 is a view similar to FIG. 18 of the cam for actuating the intake valve.
FIG. 20 illustrates the control members for shifting between four-cycle and two-cycle operation and vice versa and for actuating the fuel injection system for spontaneous combustion.

FIGS. 18 and 19 illustrate modified forms of the exhaust and intake valves respectively. In these modified forms valves 348 and 353 are provided with multiple rollers so that the cams are in engagement with the rocker arms 49 and 54 for longer periods. The exhaust cam 348 in particular may advantageously be adjusted in length by the number of rollers used and thus can adjust the length of time in which the exhaust valve is open. Thus the exhaust valve can be closed prior to complete removal of all exhaust gases to trap some of the exhaust gases in the cylinder. These gases would become mixed with a fresh air-gas mixture and may be reburned to remove uncombusted pollutants.

Figure 21:
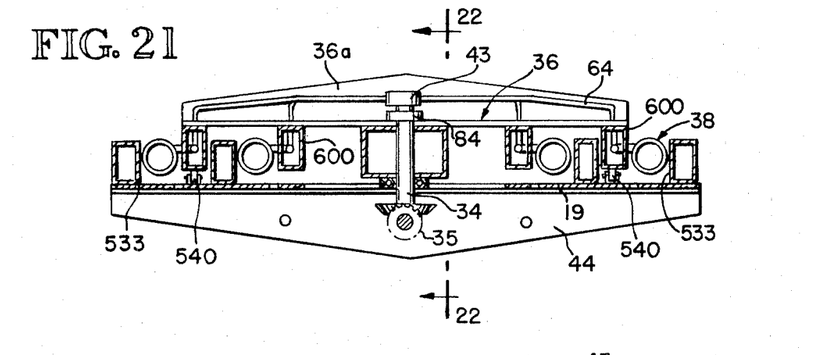
FIG. 21 is a fragmentary vertical section illustrating a modified form of the rotary engine which employes plural orbits of cylinder assemblies.
Figure 22:
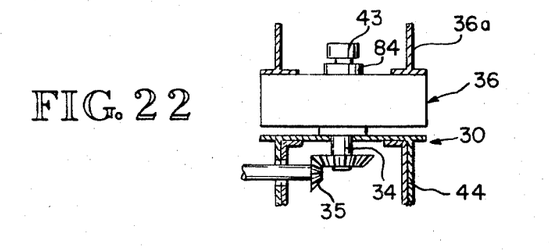
FIG. 22 is a fragmentary vertical section taken along the line 22-22 of FIG. 21.
Figure 23:
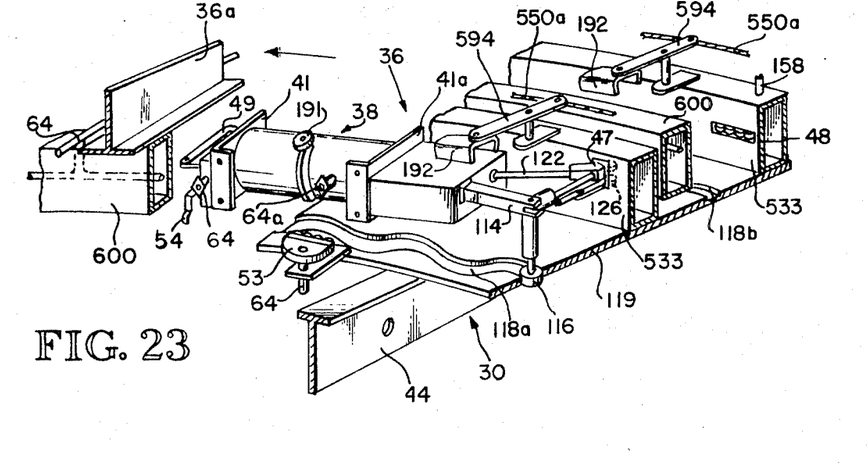
FIG. 23 is a framgentary isometric with parts broken away for clarity illustrating the multiple-orbit engine shown in FIG. 21.

Another important feature of the invention is best illustrated in FIGS. 21 – 23. As illustrated the engine can be modified to provide additional orbits of cylinder assemblies to increase the power of the engine. The basic configuration of the cylinder assemblies and the fuel, air and spark distribution are esentially the same as that described for the preferred embodiments. Consequently, similar reference numbers have been used where appropriate for clarity. In this form of the invention engine housing 30 is provided with a lower stationary sidewall 119 to which are secured engine mounting brackets 44. The sidewall 119 as in the preferred embodiment is provided with cam tracks 118a and 118b engaged by cam followers 116. As in the preferred embodiment each cam follower 116 is connected to a bellcrank 114 that is coupled to the connecting rod of the piston. Also connected indirectly to the connecting rod of the piston as in the preferred embodiment is foot rod 122 and foot rod rollers 126. The foot rod rollers engage in pockets 47 in radially spaced perpheral circular walls 533. Movable rectangular chambers 600 connected to the rotary power unit 36 by brackets 36a and house the intake manifold lines 64, 64a. Rollers 540 help to support the rotary power unit on the sidewall 119. Intake and exhaust cams 53 and 48, respectively, are provided as in the preferred embodiment for actuating the rocker arms in the cylinder assemblies 38. Likewise torsion plates 41 and 41a couple the cylinder assemblies to the rotary power unit 36. Shifting between four-cycle and two-cycle operation is accomplished with shift guides 192 with bellcranks 594 being modified as shown in FIG. 23 to accomodate cables 550a to provide for the multiple orbits.

In operation, the multiple orbits operate substantially the same as the preferred embodiments. It should be understood that the various orbits can be modified to rotate in opposite directions, however, in the preferred embodiment each orbit is designed to operate in the same direction so as to make the engine gyroscopic. If used as a ship engine, e.g., this would tend to provide a gyroscopic force to reduce ship roll. Another advantage is that each cylinder assembly is replaceable as a unit thus reducing maintenance costs.

It should be understood that the invention is not to be limited to the various forms illustrated and described but that modifications will become apparent to one skilled in the art. Accordingly, the invention should be limited only by a literal interpretation of the claims appended hereto.

The embodiments of the invention in which an exclusive property or privilege is claimed are defined as follows:

1. A rotary internal combustion engine comprising a stationary generally cylindrical housing including first and second opposed side walls and a circumferential end wall having spaced stop means, an output shaft, a rotary power unit fixed to said output shaft and having at least two cylinder assemblies, an intake manifold, a fuel supply, an exhaust collector, each of said cylinder assemblies including intake means coupled to said intake manifold and exhaust means coupled to said exhaust collector, a cylinder, a piston, and connecting rod means coupled to said piston and having a free end intermittently engageable with said stop means, and means for producing a combustion in said cylinders from a gas mixture delivered from said intake manifold for pushing said free end of said connecting rod means against said stop means to advance the rotary power unit along a rotary path to rotate said output shaft, said connecting rod means including cam operated linkage means for urging said free end of said connecting rod means radially inward for selectively placing the free end in said stop means and radially outward for positively moving said connecting rod means toward said cylinder.

2. The engine of claim 1 said intake means including an intake valve and a rocker arm for opening said intake valve, intake cam means secured to said housing for engaging said intake rocker arm to actuate said intake valve, said exhaust means including an exhaust valve and an exhaust rocker arm for opening said exhaust valve, and exhaust cam means secured to said housing for engaging said exhaust rocker arm to actuate said exhaust valve.

3. A rotary internal combustion engine comprising a stationary generally cylindrical housing including first and second opposed side walls and a circumferential end wall having spaced stop means, an output shaft, a rotary power unit fixed to said output shaft and having at least two cylinder assemblies, an intake manifold, a fuel supply, an exhaust collector, each of said cylinder assemblies including intake means coupled to said intake manifold and exhaust means coupled to said exhaust collector, a cylinder, a piston, and connecting rod means coupled to said piston and having a free end intermittently engageable with said stop means, and means for producing a combustion in said cylinders from a gas mixture delivered from said intake manifold for pushing said free end of said connecting rod means against said stop means to advance the rotary power unit to rotate said output shaft, said intake means also including four-cycle components comprising an intake valve and a rocker arm for opening said intake valve, intake cam means secured to said housing for engaging said intake rocker arm to actuate said intake valve, said exhaust means including an exhaust valve and an exhaust rocker arm, and exhaust cam means secured to said housing for engaging said exhaust rocker arm to actuate said exhaust valve, said means for converting between two-cycle and four-cycle operation including a sleeve valve selectively operable to expose said intake and exhaust ports and shift guide means selectively operable to remove said intake and exhaust cam means from the path of said rocker arms and to shift said sleeve valve whereby the ports become operative to run the engine on two cycles, and means for doubling the spark frequency when shifting to two-cycles.

4. The engine of claim 1 said exhaust collector including a circular compartment opened to said power unit rotary path for receiving exhaust products and having a filter separating the compartment into first and second circular chambers, the filter separating the second circular compartment from the direct exhaust from the cylinders.

5. The engine of claim 4 including fan means for blowing the exhaust through the filter, said fan means including louvers and a pair of blades secured to the underside of said rotary power unit.

6. The engine of claim 2 said exhaust cam means including a plurality of rollers for regulating the length of exhaust valve actuation, said exhaust rocker arm contacting an exhaust roller only for a short period during each cycle of rotation.

7. A rotary internal combustion engine comprising a stationary generally cylindrical housing including first and second opposed side walls and a circumferential end wall having spaced stop means, an output shaft, a rotary power unit fixed to said output shaft and having at least two cylinder assemblies, an intake manifold, a fuel supply, and an exhaust collector, each of said cylinder assemblies including intake means coupled to said intake manifold and exhaust means coupled to said exhaust collector, a cylinder, a piston, and connecting rod means coupled to said piston and having a free end intermittently engageable with said stop means, and means for producing a combustion in said cylinders from a gas mixture delivered from said intake manifold for pushing said free end of said connecting rod means against said stop means to advance the rotary power unit along a rotary path to rotate said output shaft, said intake means including an intake port, said exhaust means including an exhaust port and including means for converting the engine from four-cycle to two-cycle operation while running said means for producing combustion including fuel injecting means for spontaneous combustion.

8. The engine of claim 7 said fuel injecting means including a nozzle, said output shaft including a central bore and lateral bores coupling said fuel nozzle with a source of fuel and an air intake coupled to said fuel nozzle.

9. The engine of claim 7 said fuel injecting means including injection valves, at least four fuel injection cams engageable with said injection valves for delivering fuel into said cylinders, means for deactivating two of said injection cams for four-cycle operation and activating said two cams for operating four of said injection cams for two cycle operation.

10. The engine of claim 1 said rotary power unit including inner and outer rings of cylinder assemblies.

11. The engine of claim 10 each of said cylinder assemblies being individually replaceable.

12. The engine of claim 9 including means for moving said fuel injection cams toward and away from said injection valves for varying the amount of fuel allowed to be injected by said valves.

* * * * *